United States Patent
Assman et al.

(10) Patent No.: US 10,207,695 B2
(45) Date of Patent: Feb. 19, 2019

(54) COMPRESSOR SYSTEM AND METHOD FOR OPERATING THE COMPRESSOR SYSTEM IN DEPENDENCE ON THE OPERATING STATE OF THE RAIL VEHICLE

(71) Applicant: KNORR-BREMSE SYSTEME FÜR SCHIENENFAHRZEUGE GMBH, Munich (DE)

(72) Inventors: Gert Assman, München (DE); Thomas Kipp, München (DE); Thomas Merkel, Hürth (DE); Karl Hering, Reichersbeuern (DE); Robert Frank, Germering (DE); Claus Mueller, Wolfratshausen (DE)

(73) Assignee: KNORR-BREMSE SYSTEME FUR SCHIENENFAHRZEUGE GMBH (DE)

( * ) Notice: Subject to any disclaimer, the term of this patent is extended or adjusted under 35 U.S.C. 154(b) by 301 days.

(21) Appl. No.: 15/101,601

(22) PCT Filed: Dec. 2, 2014

(86) PCT No.: PCT/EP2014/076164
§ 371 (c)(1),
(2) Date: Jun. 3, 2016

(87) PCT Pub. No.: WO2015/082430
PCT Pub. Date: Jun. 11, 2015

(65) Prior Publication Data
US 2016/0311420 A1    Oct. 27, 2016

(30) Foreign Application Priority Data
Dec. 5, 2013   (DE) .................. 10 2013 113 555

(51) Int. Cl.
*B60T 17/02* (2006.01)
*F04B 35/04* (2006.01)
(Continued)

(52) U.S. Cl.
CPC .............. *B60T 17/02* (2013.01); *B60L 1/003* (2013.01); *B60T 17/002* (2013.01); *B60T 17/06* (2013.01);
(Continued)

(58) Field of Classification Search
CPC ..... B61C 1/00; B61C 8/00; B60T 5/00; B60T 8/00; B60T 8/32; B60T 8/50; B60T 8/54; B60T 13/00
See application file for complete search history.

(56) References Cited

U.S. PATENT DOCUMENTS

| 4,756,669 A | 7/1988 | Hata |
| 4,850,652 A | 7/1989 | Dumas et al. |

(Continued)

FOREIGN PATENT DOCUMENTS

| CN | 1534194 A | 10/2004 |
| CN | 202645960 U | 1/2013 |

(Continued)

OTHER PUBLICATIONS

Russian Office Action for corresponding Application 2016126728/06 dated Jul. 20, 2017.
(Continued)

*Primary Examiner* — Robert J McCarry, Jr.
(74) *Attorney, Agent, or Firm* — Barnes & Thornburg LLP

(57) ABSTRACT

A rail vehicle compressor system comprises a compressor, driven by an electrical machine via a drive shaft, for producing compressed air for at least one compressed air tank. The electrical machine is activated at least indirectly (Continued)

via a control device for operating the electrical machine at least one nominal speed between a maximum speed and a minimum speed. At least one pressure sensor determines the pressure for the control device and is disposed in a compressed-air-carrying line downstream of the compressor. A final control element for continuously influencing the speed of the electrical machine is disposed between an electrical supply and the electrical machine, wherein the control device controls activation of the final control element. A method for controlling the compressor system is also provided, wherein, the compressor is operated at a variable speed in between the maximum speed and the minimum speed based on rail vehicle operating state.

18 Claims, 1 Drawing Sheet

(51) Int. Cl.
*F04B 41/02* (2006.01)
*F04B 49/06* (2006.01)
*F04B 49/08* (2006.01)
*F04B 49/20* (2006.01)
*B61D 43/00* (2006.01)
*F04D 27/02* (2006.01)
*B60L 1/00* (2006.01)
*B60T 17/00* (2006.01)
*B60T 17/06* (2006.01)
*B61H 13/34* (2006.01)
*F04B 39/00* (2006.01)
*F04C 29/06* (2006.01)
*F04D 25/06* (2006.01)
*F04D 27/00* (2006.01)
*F04D 29/32* (2006.01)
*F04D 29/66* (2006.01)

(52) U.S. Cl.
CPC ............ *B61D 43/00* (2013.01); *B61H 13/34* (2013.01); *F04B 35/04* (2013.01); *F04B 39/0027* (2013.01); *F04B 41/02* (2013.01); *F04B 49/06* (2013.01); *F04B 49/08* (2013.01); *F04B 49/20* (2013.01); *F04C 29/06* (2013.01); *F04D 25/06* (2013.01); *F04D 27/004* (2013.01); *F04D 27/0261* (2013.01); *F04D 29/325* (2013.01); *F04D 29/663* (2013.01); *B60L 2200/26* (2013.01); *B60L 2240/36* (2013.01); *B60L 2240/421* (2013.01); *B60L 2260/26* (2013.01); *B60L 2270/142* (2013.01); *F04B 2203/0209* (2013.01); *F04B 2205/05* (2013.01); *Y02T 10/642* (2013.01); *Y02T 30/36* (2013.01)

(56) References Cited

U.S. PATENT DOCUMENTS

| | | |
|---|---|---|
| 7,600,988 B2 | 10/2009 | Doerr et al. |
| 2004/0175272 A1 | 9/2004 | Kisak et al. |
| 2004/0191073 A1 | 9/2004 | Iimura et al. |
| 2004/0265134 A1 | 12/2004 | Iimura et al. |
| 2010/0178174 A1 | 7/2010 | Mehaffey et al. |

FOREIGN PATENT DOCUMENTS

| | | | |
|---|---|---|---|
| DE | 3871575 T2 | 12/1992 | |
| DE | 4219514 A1 | 12/1993 | |
| DE | 102007019126 A1 | 10/2008 | |
| DE | 102012223996 A1 | 6/2014 | |
| EP | 1394415 A2 | 8/2003 | |
| JP | S6338693 A | 2/1988 | |
| JP | 08338369 | 12/1996 | |
| JP | H08338369 A | 12/1996 | |
| JP | 2001342982 A | 12/2001 | |
| JP | 2006522252 A | 9/2006 | |
| JP | 2007285307 * | 1/2007 | ............ F04C 18/16 |
| JP | 2007285307 A | 11/2007 | |
| RU | 2010 135 408 A | 3/2012 | |
| SU | 1557356 A1 | 4/1990 | |
| WO | 2012017939 A1 | 10/2013 | |

OTHER PUBLICATIONS

Japanese Office Action for corresponding Application 2016-536600 dated Jul. 18, 2017.
German examination report dated Oct. 7, 2014.
Search report for International Patent Application No. PCT/EP2014/076164; dated Feb. 23, 2015.
Chinese Office Action for corresponding Application 201480074099.8 dated Mar. 29, 2017.

* cited by examiner

COMPRESSOR SYSTEM AND METHOD FOR OPERATING THE COMPRESSOR SYSTEM IN DEPENDENCE ON THE OPERATING STATE OF THE RAIL VEHICLE

PRIORITY CLAIM

This patent application is a U.S. National Phase of International Patent Application No. PCT/EP2014/076164, filed 2 Dec. 2014, which claims priority to German Patent Application No. 10 2013 113 555.2, filed 5 Dec. 2013, the disclosure of which are incorporated herein by reference in their entirety.

FIELD

Disclosed embodiments relate to a compressor system for a rail vehicle, comprising a compressor which is driven by an electric machine via a drive shaft and which serves for generating compressed air for at least one compressed-air vessel, wherein the electric machine can be controlled at least indirectly using a regulation device for operation of the electric machine at least a rated rotational speed between a maximum rotational speed and a minimum rotational speed, wherein furthermore, in a compressed air-conducting line arranged downstream of the compressor, there is arranged at least one pressure sensor for determining the pressure for the regulation device. Disclosed embodiments relate to a method for controlling the compressor system according to the disclosed embodiments.

BACKGROUND

Compressors in rail vehicles are subject to a variety of, in part, conflicting demands, such as for example a high delivery output, adequate activation duration, low sound emissions, low energy consumption, a small structural space, and low purchase and life-cycle costs. Here, the compressor may satisfy extremely different demand profiles depending on the operating state of the rail vehicle. The typical problem in designing a compressor is that of finding the best comprise between these demands which is acceptable in all operating states of the rail vehicle. In general, electrically driven compressors are used in rail vehicles. The operation of the compressors takes the form of on/off operation with a constant rotational speed, the so-called rated rotational speed, between the lower activation and the upper deactivation pressure. The compressor is dimensioned such that a predefined filling time is attained and a minimum activation duration during operation is not undershot.

From the generally known prior art, it emerges that, between the different operating states of the rail vehicle, there is no difference in the operation of the compressor. Here, the fan of the cooling system is subject to the same operating regime as the compressor, as the fan is generally directly jointly driven by the compressor.

During a filling phase, the compressor is operated at the rated rotational speed. The rated rotational speed is selected such that the compressor can be operated continuously. Furthermore, the structural size of the compressor is selected such that, during track operation, a minimum activation duration is not undershot, and the maximum filling time is not overshot. During track operation, the compressor is operated intermittently. In this case, the compressor is started when the pressure in the compressed-air vessel has fallen to the activation pressure. When the deactivation pressure is reached in the compressed-air vessel, the compressor is operated at the rated rotational speed. The compressor is deactivated when the deactivation pressure is reached, and is restarted only when the pressure has dropped to the activation pressure. In the case of electrically driven rail vehicles, the drive motor is used as an electrodynamic brake during a braking phase. In the process, electrical energy is generated, wherein it is often not economical, or is in part impossible, for the electrical energy to be fed back into the electrical grid. During station operation, when the rail vehicle is stopped at a station, the compressor is operated intermittently, as it is during travel. Since there is no dominant travelling noise, sound emissions of the compressor and of the fan may be avoided. Since, when at a station, the pneumatic suspension exhibits an increased air demand owing to the embarking/disembarking of passengers, this often leads to the activation of the compressor and of the fan, and thus to undesired sound emissions while the rail vehicle is stopped at the station. Furthermore, in particular in the case of regional transport, rail vehicles are often parked in the vicinity of residential areas in an energized state, for example to prevent freezing. Here, sound emissions may be prevented to the greatest possible extent. Owing to leakage, it is often the case that the pressure in the compressed-air vessels falls to the lower activation pressure of the compressor overnight, such that refilling is necessary, and the compressor is operated intermittently at rated rotational speed. In this case, not only the sound emissions of the compressor but also further noises, such as for example the disturbing ventilation noise of the air dryer, are generated.

SUMMARY

The disclosed embodiments relate to optimize a compressor system and a method for operating the compressor system such that a substantial amount of energy can be saved in the operation of the compressor system, and the sound emissions of the compressor system can be lowered.

BRIEF DESCRIPTION OF THE FIGURES

Disclosed embodiments are explained more specifically below with reference to the accompanying drawings, in which.

DETAILED DESCRIPTION

Figure 1:
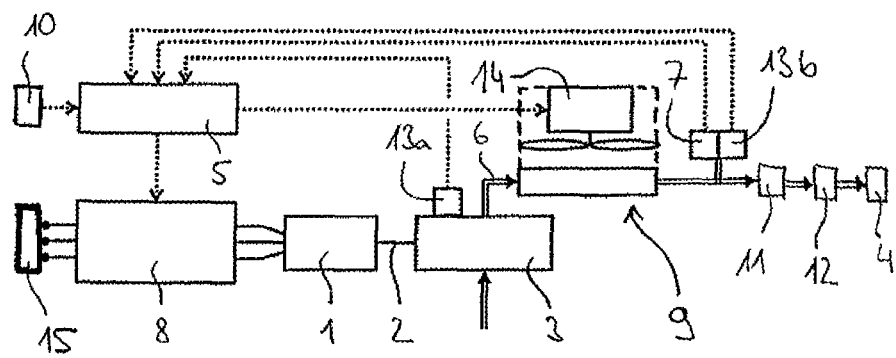
FIG. 1 shows a block circuit diagram of the compressor system according to the disclosed embodiments.

According to the disclosed embodiments, an actuator for the continuous manipulation of the rotational speed of the electric machine is arranged between an electrical supply and the electric machine, wherein the actuator is controlled using the regulation device. In other words, the actuator is situated upstream of the electric machine in the power flow, and is thus positioned ahead of the electric machine. The actuator permits operation of the electric machine at different rotational speeds. Frequency converters or inverters are particularly suitable for this purpose. In a manner dependent on frequency, the rotational speed of the electric machine and thus the operation of the compressor are adapted.

In accordance with at least one embodiment provided that the regulation device at least indirectly controls a cooler unit which is arranged downstream of the compressor and which has a cooler fan, wherein a rotational speed of the cooler fan can be continuously adjusted by the regulation device. For this purpose, an actuator may be integrated in the cooler unit. It is alternatively also conceivable for the actuator to be at least positioned upstream of the cooler unit.

With regard to a method, the compressor is operated, in a manner dependent on an operating state of the rail vehicle, with a variable rotational speed which assumes any intermediate value between the maximum rotational speed and the minimum rotational speed. By virtue of the fact that the cooler unit is not connected either directly or indirectly to the compressor, separate control of the cooler unit and thus separate adjustment of the rotational speed of the cooler fan are performed. It is advantageously also possible for the compressor and the cooler fan to be deactivated. In this way, although the compressor remains in operation, it does not deliver compressed air, or delivers only a very small amount of compressed air.

In accordance with at least one embodiment provided that, during filling operation of the rail vehicle, the compressor is operated at the maximum rotational speed. The increase in rotational speed of the compressor to the maximum rotational speed is particularly advantageous for the seldomly occurring and temporally limited filling operating mode, because this shortens the filling time, and furthermore affords the possibility of using a smaller and more lightweight compressor, which thus saves structural space. Therefore, during filling operation of the compressor, maximum power of the compressor is of primary importance. A minimum filling time is thus attained through the generation of a maximum volume of compressed air using the compressor.

In accordance with at least one embodiment provided that, during track operation of the rail vehicle, the compressor is operated with a variable rotational speed slightly above the minimum rotational speed, wherein the air pressure in the at least one compressed-air vessel is set to be slightly higher than the activation pressure. In other words, the pressure sensor can monitor, the pressure profile such that the air pressure in the at least one compressed-air vessel is set to be approximately constant, to one-tenth to two-tenths of a bar above the activation pressure of the compressor. Depending on the present compressed-air consumption, the rotational speed of the electric machine and thus the rotational speed of the compressor vary to keep the air pressure in the at least one compressed-air vessel approximately constant. Therefore, during track operation of the compressor, a maximum energy saving by the compressor is of primary importance, this being achieved by way of the variable operation of the compressor at the at least minimum rotational speed. Consequently, the compressor generates only the amount of compressed air required for setting an air pressure slightly higher than the activation pressure in the at least one compressed-air vessel.

This yields the advantage that, owing to a lower counterpressure in the at least one compressed-air vessel, the energy consumption is reduced, and more gentle operation of the compressor is realized. This furthermore results in a lower operating temperature of the compressor, whereby the cooling requirement of the compressor is likewise reduced. Furthermore, the cooler fan of the cooler unit is operated such that, within the desired temperature range, the lowest possible temperature of the compressed air at the outlet of the compressor is attained. This offers the advantage of a greater fraction of liquid water and a lower fraction of water vapour in the compressed air. The liquid water can be separated off in a pre-separator, whereas the water vapour is separated off in the air dryer. Thus, the ingress of water into the drying agent is reduced, whereby a reduced fraction of the compressed air is required for regeneration.

The disclosed embodiments encompass the technical teaching that, during braking operation of the rail vehicle, the compressor is operated with a rotational speed between the rated rotational speed and the maximum rotational speed, and a feed is provided to the at least one compressed-air vessel at least until the deactivation pressure of the compressor is reached but at most until a maximum positive pressure is reached, wherein, at the earliest after the deactivation pressure is reached but at the latest after the maximum positive pressure is reached, the compressor is operated with a variable rotational speed between the rated rotational speed and minimum rotational speed. In other words, the available electrical energy is utilized for completely filling the at least one compressed-air vessel. Subsequently, the rotational speed of the compressor decreases into the range above the activation pressure, and maintains the pre-defined maximum pressure in the at least one compressed-air vessel until the end of the braking phase. This offers the advantage of internal utilization of the electrical energy during the braking phase, and permits an energy saving, because a feedback of the electrical energy into the electrical grid is not always possible. Therefore, during braking operation of the compressor, the primary aim is that of achieving maximum energy recovery of the compressor. This is attained in particular by way of a maximum infeed of compressed air into the at least one compressed-air vessel during braking operation, and by maintaining the maximum positive pressure in the at least one compressed-air vessel.

In accordance with at least one embodiment provided that the compressor is either deactivated after the braking operation has come to an end, and is set to the minimum rotational speed when the activation pressure is reached. Thus, at the end of the braking phase, during subsequent operation, the compressor saves energy that has been consumed during the braking phase. The deactivation of the compressor or the setting of the minimum rotational speed is maintained until the pressure in the at least one compressed-air vessel reaches the regulation pressure.

In one exemplary embodiment, it is provided that, before a period of station operation, the regulation device receives from a train management system a signal regarding the impending period of station operation, wherein the rotational speed of the compressor is set at least to the rated rotational speed to provide a feed to the at least one compressed-air vessel until the maximum positive pressure is reached. Thus, all of the vessels are filled to the maximum pressure in preparation for a stoppage at the station. The pressure level is subsequently held until the rail vehicle comes to a standstill.

In accordance with at least one embodiment provided that, during the station operation, the compressor is either deactivated or operated at the minimum rotational speed. Thus, when at a standstill, the compressor can be deactivated or kept at minimum rotational speed until the regulation pressure is reached in the at least one compressed-air vessel. It is thus possible to predominantly avoid operation of the compressor during station operation. The cooler fan remains deactivated for as long as possible, or is operated at only such a speed that the admissible maximum temperature in the compressor or at the compressed-air outlet is not exceeded. In this way, during stoppages at stations, sound emissions from the compressor and from the cooler fan are minimized. Furthermore, the entire compressor system can be constructed in such a way as to save structural space, as the possibility of dispensing with passive measures for sound deadening is eliminated. Therefore, during station operation of the compressor, the primary aim is that of achieving minimal sound emissions of the compressor and of the cooler fan. This is achieved in particular by virtue of the compressor and the cooler fan being deactivated or being operated at minimum rotational speed.

It is advantageously provided that, in overnight standby operation, the compressor is operated with intermittent alternation between the minimum rotational speed when the pressure falls to the activation pressure and deactivation of the compressor when the deactivation pressure is reached. Owing to the reduced rotational speed level, the sound emissions of the rail vehicle when parked in an energized state are minimized. Furthermore, the cooler fan also remains deactivated for as long as possible, or is operated by the regulation device at only such a speed that the admissible maximum temperature in the compressor or at the compressed-air outlet is not exceeded. Alternatively, the cooler unit may be utilized to reduce the ingress of water vapour into the air dryer to such an extent that, during the course of a night, no regeneration of the air dryer is necessary, such that no disturbing ventilation noise is generated.

Using internally provided information of the rail vehicle, the regulation device is operated, in accordance with the operating state of the rail vehicle, such that energy for operating the compressor system is saved and the sound emissions of the compressor system are lowered.

As per FIG. 1, a compressor system for a rail vehicle has an electric machine 1 which, via a drive shaft 2, drives a compressor 3 for generating compressed air. The compressed air generated by the compressor 3 is conducted via a compressed air-conducting line 6 to a cooler unit 9 which has a cooler fan 14. A pressure sensor 7 and a temperature sensor 13b are arranged downstream of the cooler unit 9 in the compressed air-conducting line 6. Furthermore, the compressed air-conducting line 6 issues into a pre-separator 11, downstream of which there is connected an air treatment system 12. The dried compressed air, which has been purified of particles, is then fed into a compressed-air vessel 4. A temperature sensor 13a, which is arranged at the compressor 3, and the temperature sensor 13b and the pressure sensor 7 transmit the measured temperatures and the measured pressure to the regulation device 5. Furthermore, the regulation device 5 also receives signals from a train management system 10. Furthermore, the regulation device 5 is suitable for both controlling the rotational speed of the cooler unit 9 and transmitting signals to an actuator 8. The actuator 8, which is in the form of a frequency converter, sets the rotational speed of the electric machine 1 and thus the rotational speed of the compressor 3. In this case, the actuator 8 is, for the continuous manipulation of the rotational speed of the electric machine 1, arranged between an electrical supply 15 and the electric machine 1.

Figure 2:
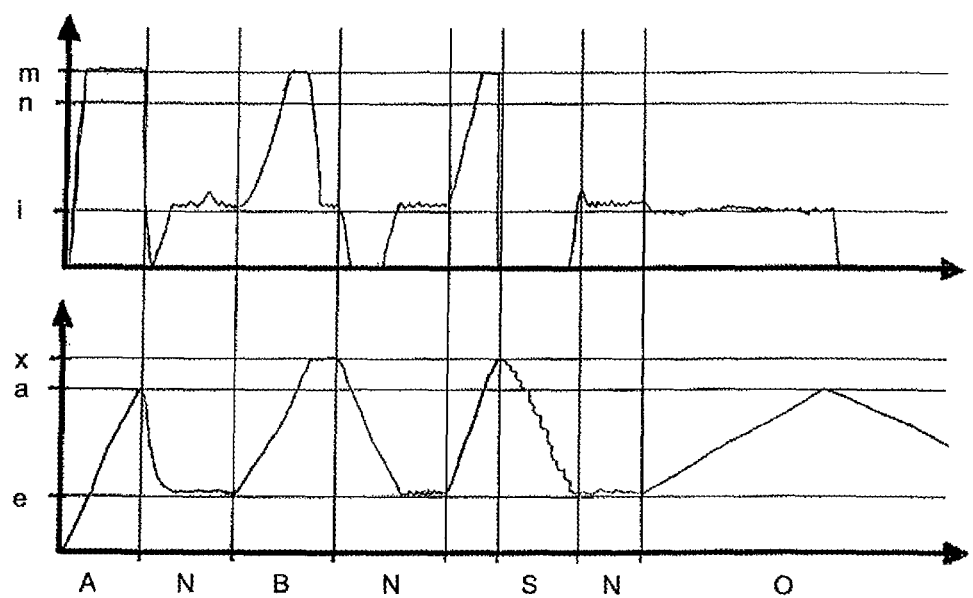
FIG. 2 shows two related diagrams, wherein a rotational speed of the compressor is plotted versus time in the upper diagram, and a pressure of the compressor is plotted versus time in the lower diagram.

In FIG. 2, it can be seen that the air pressure in the compressed-air vessel 4 can be adjusted by way of the rotational speed of the compressor 3. The upper diagram illustrates the profile of the rotational speed versus time, and the lower diagram illustrates the profile of the air pressure in the compressed-air vessel 4 versus time. During filling operation A of the rail vehicle, the compressor 3 is operated with maximum rotational speed m until the air pressure in the compressed-air vessel 4 reaches the deactivation pressure a. During subsequent track operation N of the rail vehicle, the compressor 3 is operated with a variable rotational speed slightly above the minimum rotational speed i, wherein the air pressure in the compressed-air vessel 4 is set to be slightly higher than the activation pressure e.

During braking operation B of the rail vehicle, the compressor 3 is operated at the rated rotational speed n, and a feed is provided to the compressed-air vessel 4 until a maximum positive pressure x is reached, wherein, after the maximum positive pressure x has been reached, the compressor 3 is operated at a variable rotational speed between the rated rotational speed n and the minimum rotational speed i and slightly above the minimum rotational speed i. After the braking operation B has come to an end, the compressor 3 is deactivated, and is set to the minimum rotational speed i only when the activation pressure e is reached. The rail vehicle is thus in track operation N again.

Before a period of station operation S, the regulation device 5 receives from the train management system 10 a signal regarding the impending period of station operation S, wherein the rotational speed of the compressor 3 is set to the maximum rotational speed m to provide a feed to the at least one compressed-air vessel 4 until the maximum positive pressure x is reached. During station operation S, the compressor 3 is deactivated. When the activation pressure e is reached, the compressor 3 is set to the minimum rotational speed i. After the period of station operation S, the rail vehicle is in track operation N again. In overnight standby operation O, the compressor 3 is operated with intermittent alternation between the minimum rotational speed i when the pressure falls to the activation pressure e and deactivation of the compressor 3 when the deactivation pressure a is reached.

The disclosed embodiments are not restricted to at least one disclosed embodiment described above. Rather, modifications thereto are also possible which are also encompassed by the scope of protection of the following claims. For example, it is also possible for the compressor 3 to provide a feed to a multiplicity of compressed-air vessels 4. It is furthermore also conceivable for the actuator 8 to have two outputs and to thus set both the rotational speed of the electric machine 1 and the rotational speed of the cooler fan 14 by way of the regulation device 5.

LIST OF REFERENCE SIGNS

1 Electric machine
2 Drive shaft
3 Compressor
4 Compressed-air vessel
5 Regulation device
6 Compressed air-conducting line
7 Pressure sensor
8 Actuator
9 Cooler unit
10 Train management system
11 Pre-separator
12 Air treatment system
13a, 13b Temperature sensor
14 Cooler fan
15 Electrical supply
a Deactivation pressure
e Activation pressure
i Minimum rotational speed
m Maximum rotational speed
n Rated rotational speed
x Maximum positive pressure
A Filling operation
B Braking operation
N Track operation O Overnight standby operation
S Station operation

The invention claimed is:
1. A compressor system for a rail vehicle, comprising:
at least one compressed air vessel;
an electric machine;
a drive shaft;
a compressor which is driven by the electric machine via the drive shaft and which generates compressed air for the at least one compressed-air vessel;
a regulation device that controls the electric machine for operation of the electric machine at least a rated rotational speed between a maximum rotational speed and a minimum rotational speed;
a compressed air-conducting line arranged downstream of the compressor and including at least one pressure sensor for determining pressure for the regulation device;
an electrical supply;
an actuator arranged between the electrical supply and the electric machine for continuous manipulation of the rotational speed of the electric machine, wherein the actuator is controlled by the regulation device, and
a cooler unit, wherein the regulation device at least indirectly controls the cooler unit which is arranged downstream of the compressor and which has a cooler fan, wherein a rotational speed of the cooler fan is adjustable using the regulation device.

2. The compressor system of claim 1, wherein the compressor is operated, in a manner dependent on an operating state of the rail vehicle, with a variable rotational speed which assumes any intermediate value between the maximum rotational speed and the minimum rotational speed.

3. The compressor system of claim 2, wherein, during filling operation of the rail vehicle, the compressor is operated at the maximum rotational speed.

4. The compressor system of claim 2, wherein, during track operation of the rail vehicle, the compressor is operated with a variable rotational speed slightly above the minimum rotational speed, wherein air pressure in the at least one compressed-air vessel is controlled to be slightly higher than an activation pressure.

5. The compressor system of claim 2, wherein, during braking operation of the rail vehicle, the compressor is operated with a rotational speed between the rated rotational speed and the maximum rotational speed, and a feed is provided to the at least one compressed-air vessel at least until a deactivation pressure of the compressor is reached and at most until a maximum positive pressure is reached, wherein, in between the deactivation pressure being reached and just after the maximum positive pressure being reached, the compressor is operated with a variable rotational speed between the rated rotational speed and minimum rotational speed.

6. The compressor system of claim 5, wherein the compressor is deactivated after the braking operation has come to an end, and is set to the minimum rotational speed in response to the activation pressure being reached.

7. The compressor system of claim 2, wherein, before a period of station operation, the regulation device receives from a train management system a signal regarding impending period of station operation, wherein the rotational speed of the compressor is set at least to the rated rotational speed in order to provide a feed to the at least one compressed-air vessel until the maximum positive pressure is reached.

8. The compressor system of claim 7, wherein, during station operation, the compressor is either deactivated or operated at the minimum rotational speed.

9. The compressor system of claim 2, wherein, in overnight standby operation, the compressor is operated with intermittent alternation between the minimum rotational speed when the pressure falls to the activation pressure and deactivation of the compressor when the deactivation pressure is reached.

10. A method of controlling operation of a compressor system for a rail vehicle, the method comprising:
generating compressed air for at least one compressed air vessel using a compressor driven by an electric machine via a drive shaft;
controlling the electric machine using a regulation device that controls the electric machine for operation of the electric machine at least a rated rotational speed between a maximum rotational speed and a minimum rotational speed;
determining pressure for the regulation device using at least one pressure sensor located in a compressed air-conducting line arranged downstream of the compressor; and
continuously manipulating the rotation speed of the electric machine using an actuator arranged between an electrical supply and the electric machine, wherein the actuator is controlled by the regulation device, and
controlling a cooler unit that is arranged downstream of the compressor and includes a cooler fan using the regulation device, wherein a rotational speed of the cooler fan is adjustable using the regulation device.

11. The method of claim 10, wherein the compressor is operated, in a manner dependent on an operating state of the rail vehicle, with a variable rotational speed which assumes any intermediate value between the maximum rotational speed and the minimum rotational speed.

12. The method of claim 11, wherein, during filling operation of the rail vehicle, the compressor is operated at the maximum rotational speed.

13. The method of claim 11, wherein, during track operation of the rail vehicle, the compressor is operated with a variable rotational speed slightly above the minimum rotational speed, wherein air pressure in the at least one compressed-air vessel is controlled to be slightly higher than an activation pressure.

14. The method of claim 11, wherein, during braking operation of the rail vehicle, the compressor is operated with a rotational speed between the rated rotational speed and the maximum rotational speed, and a feed is provided to the at least one compressed-air vessel at least until a deactivation pressure of the compressor is reached and at most until a maximum positive pressure is reached, wherein, in between the deactivation pressure being reached and just after the maximum positive pressure being reached, the compressor is operated with a variable rotational speed between the rated rotational speed and minimum rotational speed.

15. The method of claim 14, further comprising, deactivating the compressor after the braking operation has come to an end, and is set to the minimum rotational speed in response to the activation pressure being reached.

16. The method of claim 11, wherein, before a period of station operation, the regulation device receives from a train management system a signal regarding impending period of station operation, wherein the rotational speed of the compressor is set at least to the rated rotational speed in order to provide a feed to the at least one compressed-air vessel until the maximum positive pressure is reached.

17. The method of claim 16, wherein, during station operation, the compressor is either deactivated or operated at the minimum rotational speed.

18. The method of claim 11, wherein, in overnight standby operation, the compressor is operated with intermittent alternation between the minimum rotational speed when the pressure falls to the activation pressure and deactivation of the compressor when the deactivation pressure is reached.

* * * * *